United States Patent [19]
Pickles et al.

[11] Patent Number: 5,697,811
[45] Date of Patent: Dec. 16, 1997

[54] MOUNTING ASSEMBLY FOR ELECTRICAL TERMINATION BLOCKS

[75] Inventors: Timothy James Pickles, Aurora; David Yanish, Evergreen; Ron Ward, Louisville, all of Colo.; Jörg Lorscheider, Dana Point, Calif.

[73] Assignee: Krone AG, Berlin-Zehlendorf, Germany

[21] Appl. No.: 637,848

[22] Filed: Apr. 25, 1996

[51] Int. Cl.⁶ .................................................. H01R 9/26
[52] U.S. Cl. ........................ 439/532; 439/716; 439/717; 211/26; 211/175
[58] Field of Search .................................. 439/716, 717, 439/532, 94; 211/26, 175

[56] References Cited

U.S. PATENT DOCUMENTS

| 4,278,315 | 7/1981 | Osborne | 439/716 |
| 5,458,248 | 10/1995 | Alain | 211/175 |
| 5,494,461 | 2/1996 | Bippus et al. | 439/719 |
| 5,531,414 | 7/1996 | Benedetto et al. | 439/716 |

*Primary Examiner*—Gary F. Paumen
*Attorney, Agent, or Firm*—McGlew and Tuttle

[57] ABSTRACT

The present invention relates to the field of electrical connectors and in particular to a mounting assembly for terminal blocks with nip-clinch physical connectors where the mounting assemblies is adjustable to accommodate electrical termination blocks of different sizes.

24 Claims, 13 Drawing Sheets

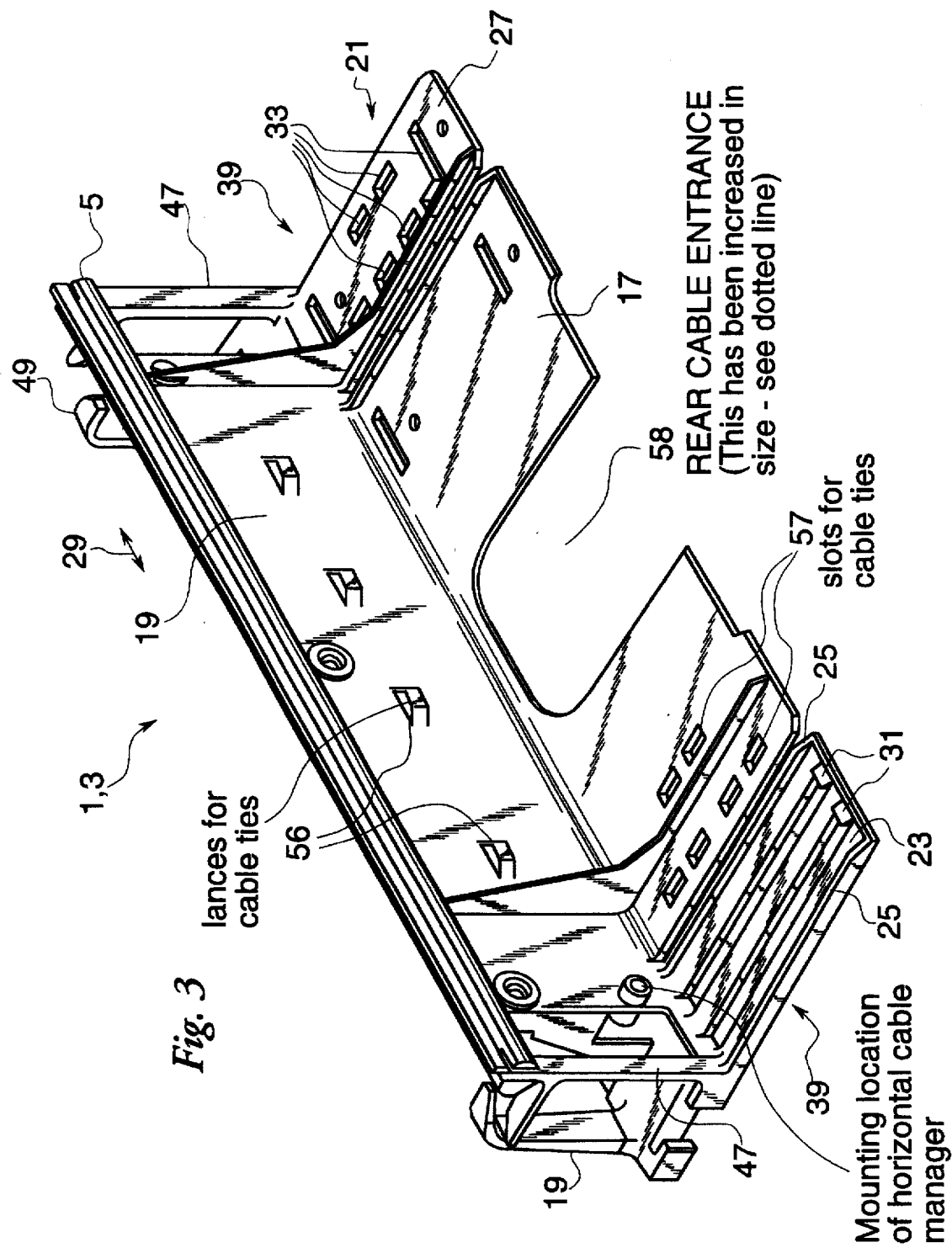

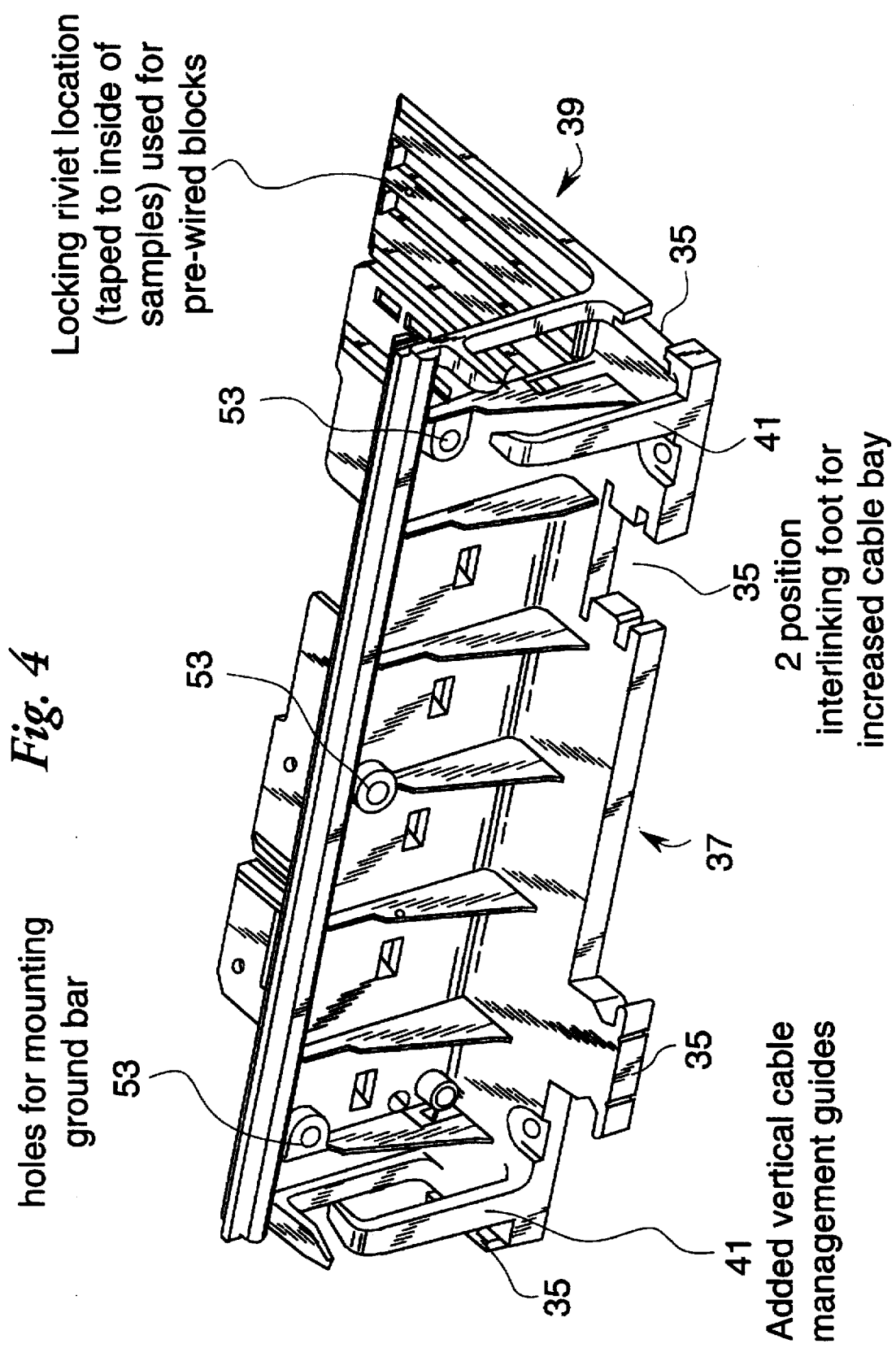

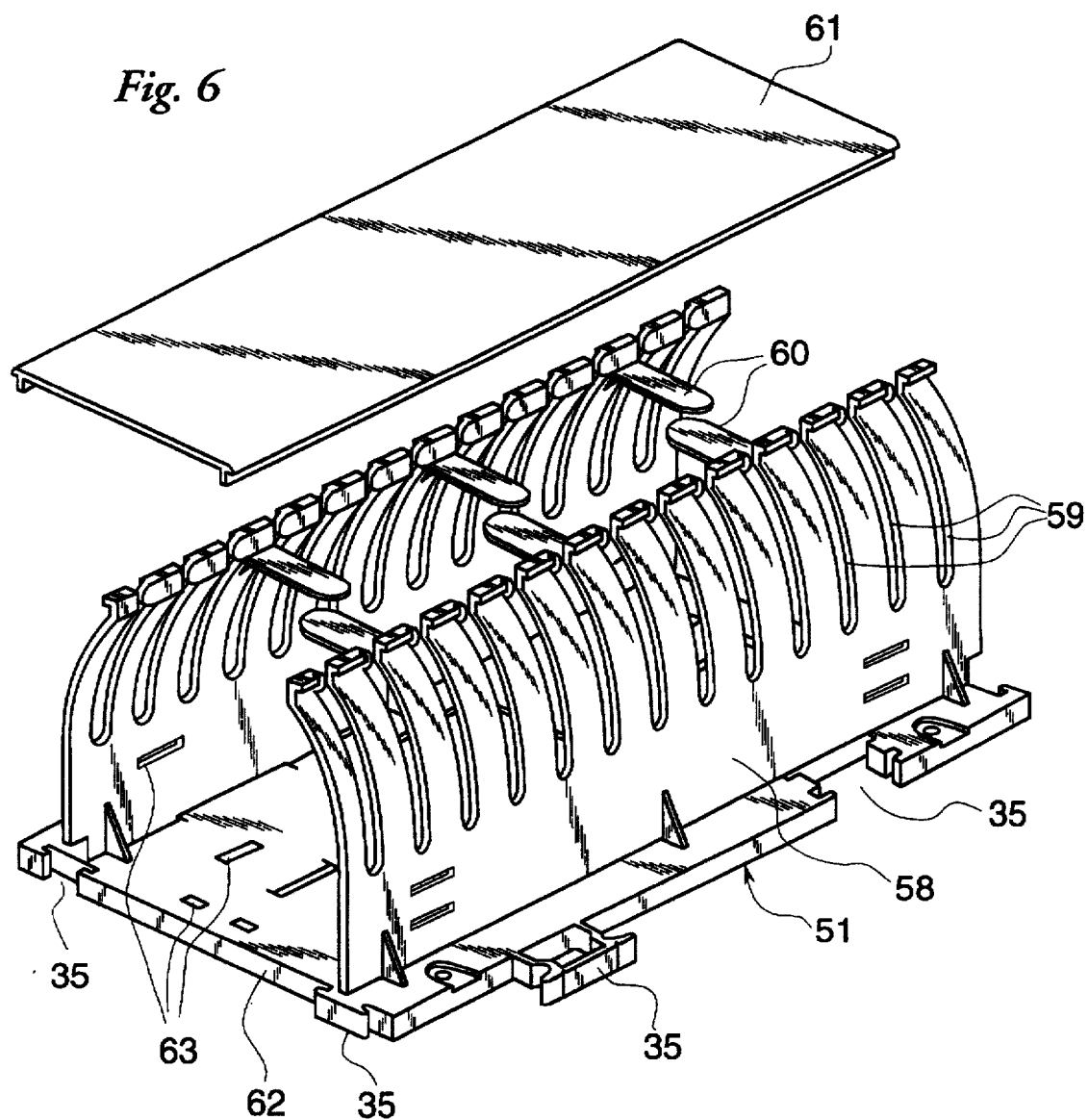

Ground Bar

55

MOUNTING ASSEMBLY FOR ELECTRICAL TERMINATION BLOCKS

FIELD OF THE INVENTION

The present invention relates to the field of connectors for communications applications and in particular to a mounting assembly for terminal blocks such as terminal blocks with nip-clinch physical connectors.

BACKGROUND OF THE INVENTION

When an electrical connection must be made by a wire between two distant points, it is often impractical to use a single wire. This is especially true in the field of telephone and computer (data) communications. It is often easier to individually wire portions of a distance between two points and then to connect the portions. This is especially true when connecting an individual telephone to the switching apparatus of the telephone company. To connect a single individual wire from the central switching office apparatus to an individual phone would be very impractical. Therefore often a single cable extends from the building housing the switching apparatus to the building housing the individual phone. Separate wires run inside the building from the phone to the outside cable. The inside cable must therefore be connected to the outside cable. It is also possible for the outside cable to be divided into several smaller outside cables which need to be individually connected.

In order to facilitate the connection of the inside cables to the outside cables, terminal blocks are used. The terminal blocks are designed so that it is easy to electrically connect the wires from the outside cable to the terminal block, and then to attach the inside wires to the terminal block so that the inside wires make electrical connection with the corresponding outside wires.

In large buildings, with many individual telephone lines and computer data lines, the connections between the inside lines, and the outside lines, and even connections between lines that run vertically in a building to those lines that run horizontally on each floor, can become very large. Therefore wiring closets are set up to house the electrical termination blocks for connections between wires. Mounting assemblies are often provided which can accommodate a plurality of electrical termination blocks. The mounting assembly may be mounted on a wall and may include two parallel mounting means or profile rails onto which the termination block clamps onto with mounting connectors as described in Applicant's copending U.S. Pat. Nos. 5,494,461 and 5,531,414 which are hereby incorporated by reference. Since the mounting assembly is relatively inexpensive with respect to the termination block, and a mounting assembly can be difficult to mount on a wall, it is often the practice to use a mounting assembly that can hold a plurality of termination blocks. The mounting assembly is mounted on the wall and the termination blocks are added onto the mounting assembly as needed.

Electrical termination blocks come in many sizes, such as termination blocks which can accommodate 8 pairs of wires, 10 pairs of wires, 25 pairs of wires or blocks which accommodate 100 pairs of wires. Such different termination blocks require that the mounting rails be spaced at different distances. Therefore different mounting assemblies are needed for different termination blocks.

Also since it is relatively difficult and time consuming to mount a mounting assembly onto a wall, it is often desirable to mount all the mounting assemblies that may ever be needed onto a wall at one time. This has the disadvantage that a large number of mounting assemblies for all different sizes must be manufactured, or purchased, and may never be used.

SUMMARY AND OBJECTS OF THE INVENTION

It is an object of the present invention to overcome the problem of requiring different mounting assemblies for different sized termination blocks, and to reduce the cost of a mounting assembly so that it is less expensive to purchase, store and mount additional mounting assemblies to accommodate future growth.

The present invention attains these objects by providing a mounting assembly which is composed of two identical brackets. The brackets are so designed so that they have a sliding connection. Each of the brackets has a mounting means such as a rail, and the sliding connection allows the mounting means or rails to be adjustably spaced from each other while the brackets are still connected to each other. In this way, the mounting assembly of the present invention can be used for any size electrical termination block. This reduces the cost since only one mounting assembly needs to be produced for all sizes of termination block. The costs in purchasing and maintaining different size machines, and for tracking different size parts is avoided since only machinery and tracking for a single type of mounting assembly is needed.

The two parts of the mounting assembly of the present invention are preferably substantially identical, except for such things as manufacturing tolerances. Using a single mold component, a multicomponent mounting assembly can be produced with only the machinery and tracking costs required for a single component assembly. This then further reduces the costs of a mounting assembly.

Each bracket has a base portion and a mounting portion. The mounting portion preferably extends perpendicular to the plane of the base, and the base is fastenable to a wall. The brackets also have a slide connection means which is preferably formed integrally with the base. The slide connection means on each bracket is formed of a first par and a second part. The first part is positioned on a first end of the base and the second part is positioned on a second end of the base. These sliding connection pars are so designed so that when one bracket is rotated 180° about an axis normal to the base, the first sliding par of one bracket is slidably connected with the second sliding part of the second bracket. In this way each end of the brackets are slidably connected to the other bracket without the need of different components. Snap means are preferably incorporated into the slide connection at predetermined distances, in order to make it easy to adjust the distance between the mounting rails for standard sized termination blocks.

Link means can be provided on the end sides and one lateral side of a bracket so that slidably connected brackets can be linked with adjacent brackets on the end and lateral sides. In this way several mounting assemblies can be easily and efficiently mounted on the wall of a wiring closet.

The present invention also includes cable holders which can be either integrally formed with the individual brackets, and/or can be separate components which can be detachably mounted onto the brackets. The cable holders are positioned on the outside lateral side of the bracket and/or the end sides of the bracket. In this way the cables that lead to the termination blocks can be easily and orderly positioned. The individual brackets also define a cable axis opening in the base of the bracket, so that cables may enter from the back of the bracket, or the portion of the bracket that is mounted on the wall. This is very beneficial when cables enter the wiring closet from behind the wall or the brackets are mounted on a rack such as a EIA/TIA equipment rack via a preferable metal backboard. Cable tie means or mounts are also provided on the individual brackets so that cable ties can be passed through these cable tie mounts and then around the cables to firmly secure the cables to the brackets.

Each bracket also contains mounting structure for mounting an optional ground bar onto the side of the bracket.

All of these above features combine to form a mounting assembly for electrical termination blocks which is easy to manufacture and install, while being very versatile in many different situations and having many accessories that are useful in making connections between separate cables.

It is also an object of the present invention to provide a mounting assembly which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 3 is a perspective view of one of the identical brackets from the side of the bracket adjacent the slide connection means;

FIG. 4, is a perspective view of the identical bracket from a side opposite the slide connection means;

FIG. 6 is several different angular views of a separate lateral cable holder;

DETAILED DESCRIPTION OF THE PREFERRED EMBODIMENT

Figure 1:
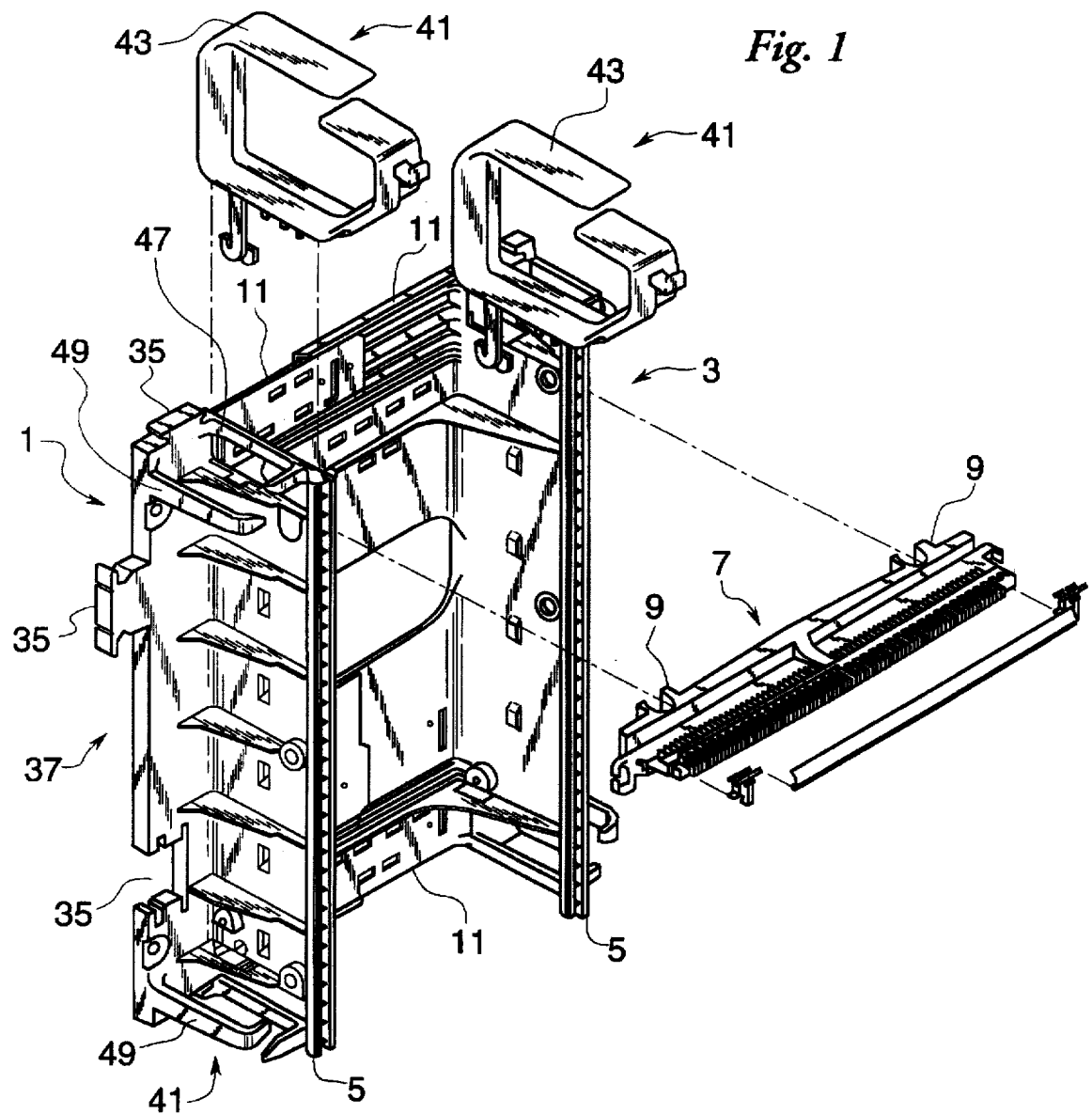
FIG. 1 is a perspective view of the mounting assembly of the present invention adapted for a 25 pair terminal block.

Referring to the drawings, in particular to FIG. 1, the present invention comprises a first bracket 1 and a second bracket 3. The brackets 1, 3 are so designed so that when one bracket is angularly positioned with respect to the other bracket, the two brackets are able to be slidably connected as shown in FIG. 1. Each bracket has a mounting means such as a rail 5, fish plate ends, an earth mounting tab or a clip upon which a terminal block 7 can be mounted. The terminal block 7 has mounting connectors 9 at the ends which fasten to the mounting means of the bracket. The mounting connectors 9 can be of the nip-clinch type, rod mount grip type or slots to receive fish plates, earth mounting tabs or clips.

Each bracket 1, 3 has slide connection means 11 for slidably connecting the two brackets 1, 3. The slide connection means allows the mounting rails 5 of each bracket to be adjustably spaced apart in order to connect to the nip-clinch connectors 9 of the terminal block 7. The terminal block 7 shown in FIG. 1 is a 25 pair terminal block and has a set or predetermined distance between the two nip-clinch connectors 9.

Figure 2:
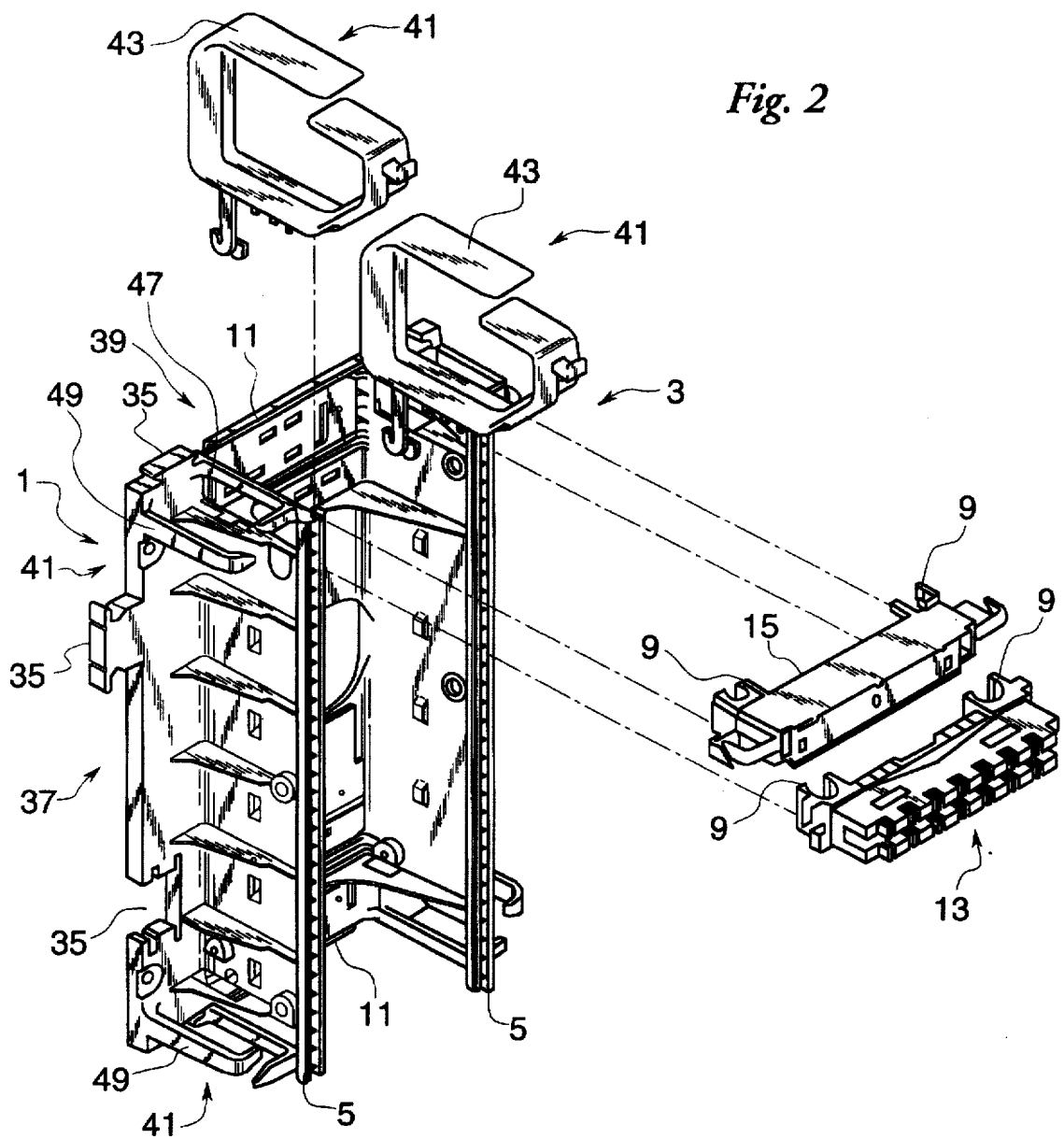
FIG. 2 is a perspective view of the present invention adapted for a 8 pair or 10 pair terminal block.
Figure 5B:
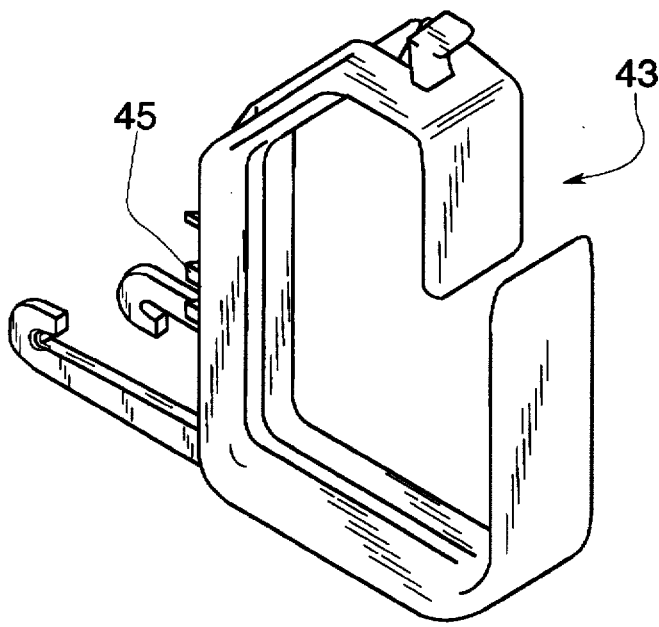
FIGS. 5A, 5B, 5C and 5D are different views of the end cable holder.
Figure 5C:
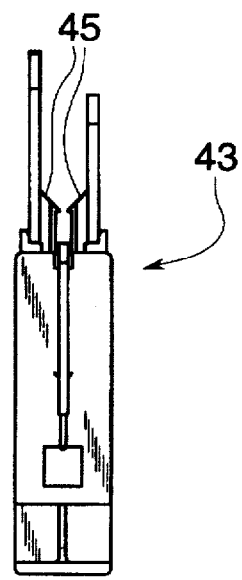
Figure 5A:
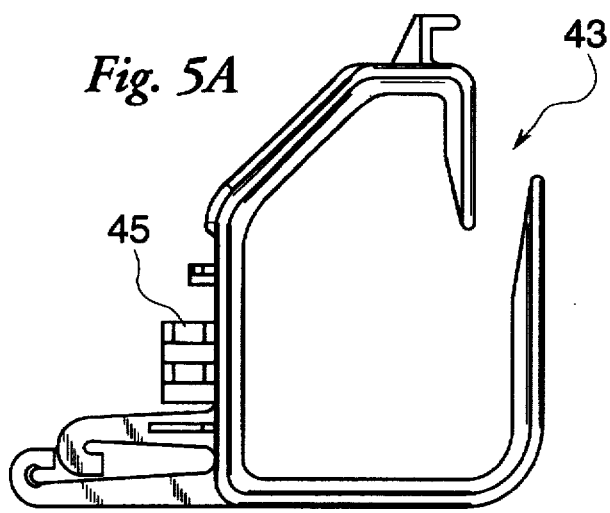
Figure 5D:
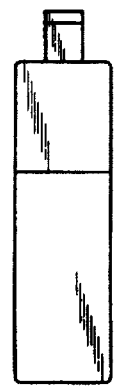

FIG. 2 shows slidably connected brackets 1, 3 which are adjustably positioned with respect to each other so that the mounting rails 5 are properly positioned to engage with the nip-clinch connectors of a 8 or 10 pair terminal block 13 and/or the nip-clinch connectors 9 of a label holder 15 for a 8 or 10 pair terminal block 13.

The first and second brackets 1, 3 are designed to be substantially identical, with differences for only such things as manufacturing tolerances. FIG. 3 shows the bracket which is used for the first and second brackets 1, 3. The bracket is formed of a base 17 and a mounting portion 19. The mounting portion 19 extends from base 17, preferably in a direction substantially normal to the plane of the base 17. The slide connection means 11 has a first part 21 and a slide connection second part 23. When one of the brackets 1, 3 is rotated by approximately 180° about an axis normal to the base 17, the first and second parts 21, 23 of the slide connection means are designed to slide against each other and connect the first and second brackets 1, 3 together in an adjustably spaced manner. In the preferred embodiment, slide connection first part 21 slides, on top of slide connection second part 23 and is held longitudinally aligned by ridges 25 of the slide connection second part 23. These ridges 25 prevent a tab 27 of the slide connections first part 21 from moving in a longitudinal direction 29. Latches 31 cooperate with latch openings 33 to form a snap means which locks the first and second brackets 1, 3 into the predetermined positions where the corresponding mounting rails will correspond to standard sizes of termination blocks 7, 15.

As shown in FIG. 4, each bracket 1, 3 has link means 35 for connecting two adjacent brackets on a side other than the slide means. The link means 35 are preferably positioned on one lateral side 37 and the end sides 39. The link means and the slide connection means are designed into the brackets so that the first and second brackets are substantially identical. Each mounting bracket also has cable holder means 41 which can be positioned on the lateral side 37 and/or the end sides 39. The end cable holders 43 are preferably detachably connected to the brackets 1, 3 so that they can be repetitively connected and disconnected without destruction of the brackets or the end cable holders. The end cable holders 43 have latches 45 which latch onto a post 47 of the brackets.

The lateral cable holders 49 are preferably molded in one piece with the bracket, as well as is the slide connection means and the link means. It is also possible for a separate lateral cable holder 51, as shown in FIG. 6 to be separately connectable to the lateral side 37 of the brackets. The separate lateral cable holder 51 then is preferably also equipped with link means 35 in order to connect to the bracket in the same manner as adjacent brackets would through the link means. The separate lateral cable holders have link means 35 on both sides of the separate lateral cable holder 51 in order that each lateral side of the separate cable holder 51 can either attach to a bracket or another separate lateral cable holder on both sides. A cable holder wall 58 defines cable slots 59 for patch cord distribution. The cable holder 51 also includes a cable cover 61 which slides or snaps over the ends of the cable holder walls 58 and interlocks with the ends of the cable holder wall 58 to be fastened to the cable holder wall 58. The cable cover 61 holders the cables inside the cable holder. The cable holder walls 58 also have cable retention struts 60 which also hold the cables inside the cable holder walls 58. The cable retention means are especially useful when the cable cover 61 is removed, such as in situations where one or two of the cables inside the cable holder walls need to be accessed without having the rest of the cables falling out. A cable holder base 62 and the cable holder walls 58 define cable tie slots 63 for passing a line or strap though and bundle the cables to the cable holder 51.

Figure 7:
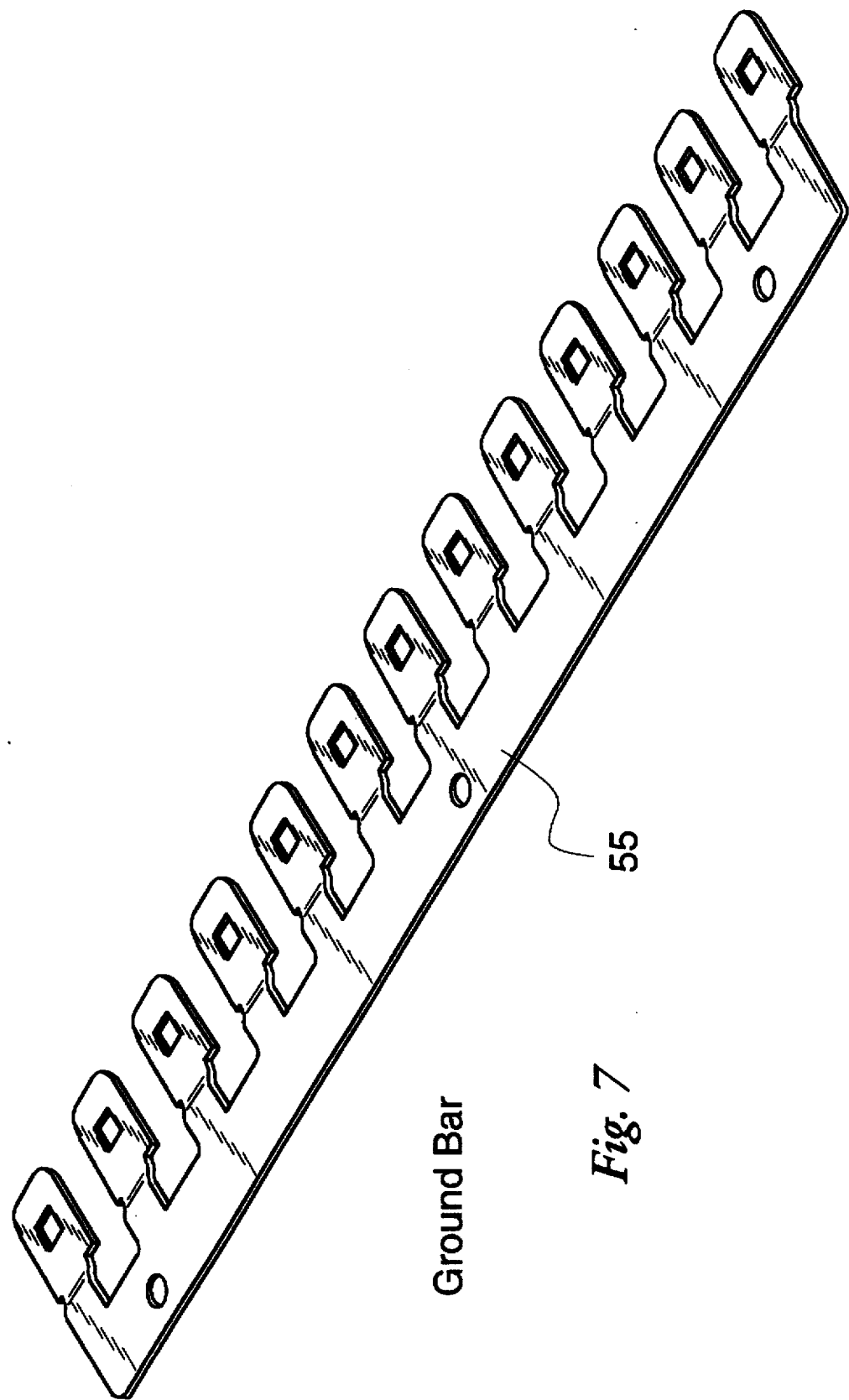
FIG. 7 is a perspective view of the ground bar.
Figure 8:
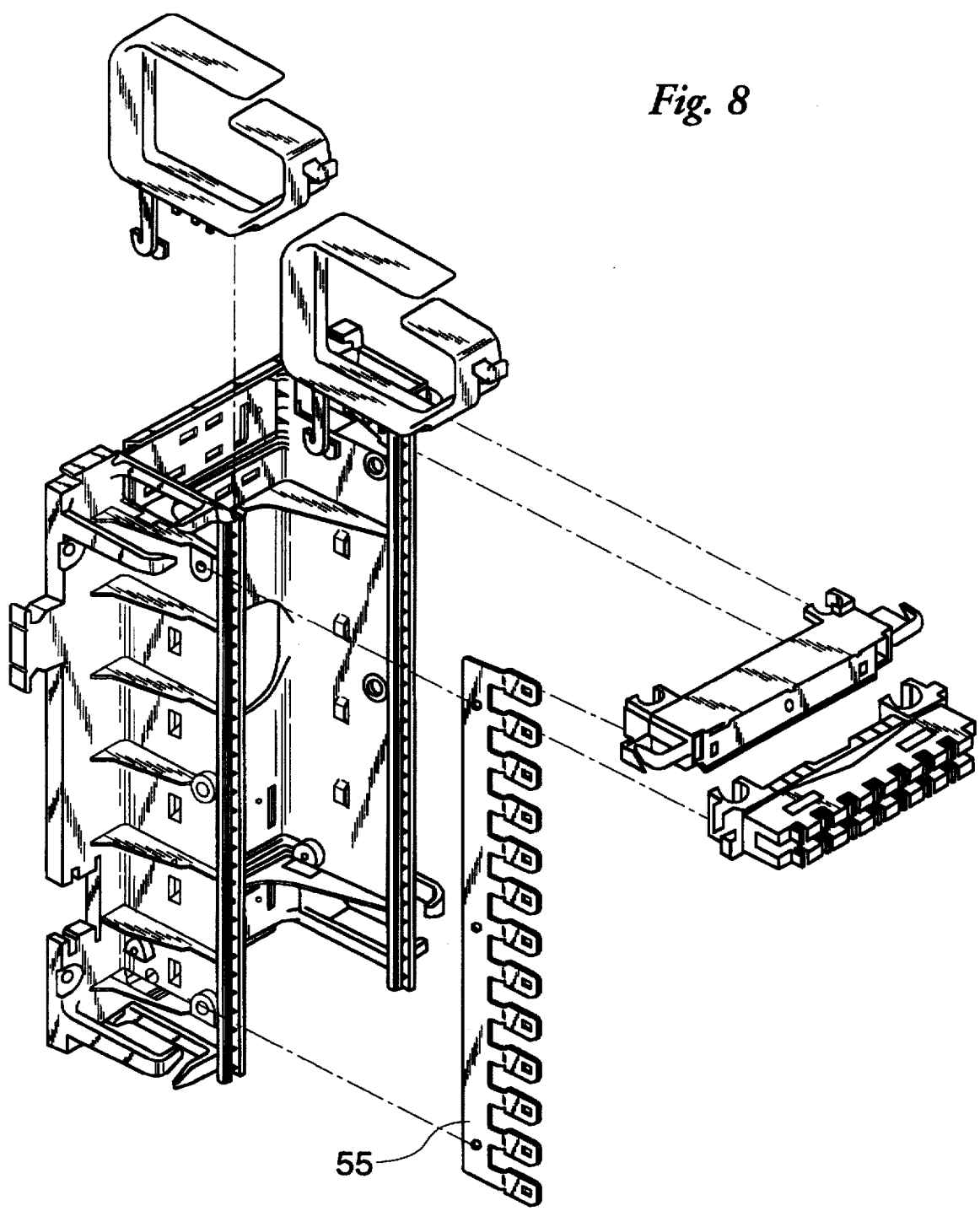
FIG. 8 is a perspective view of the mounting assembly with a ground bar.
Figure 9:
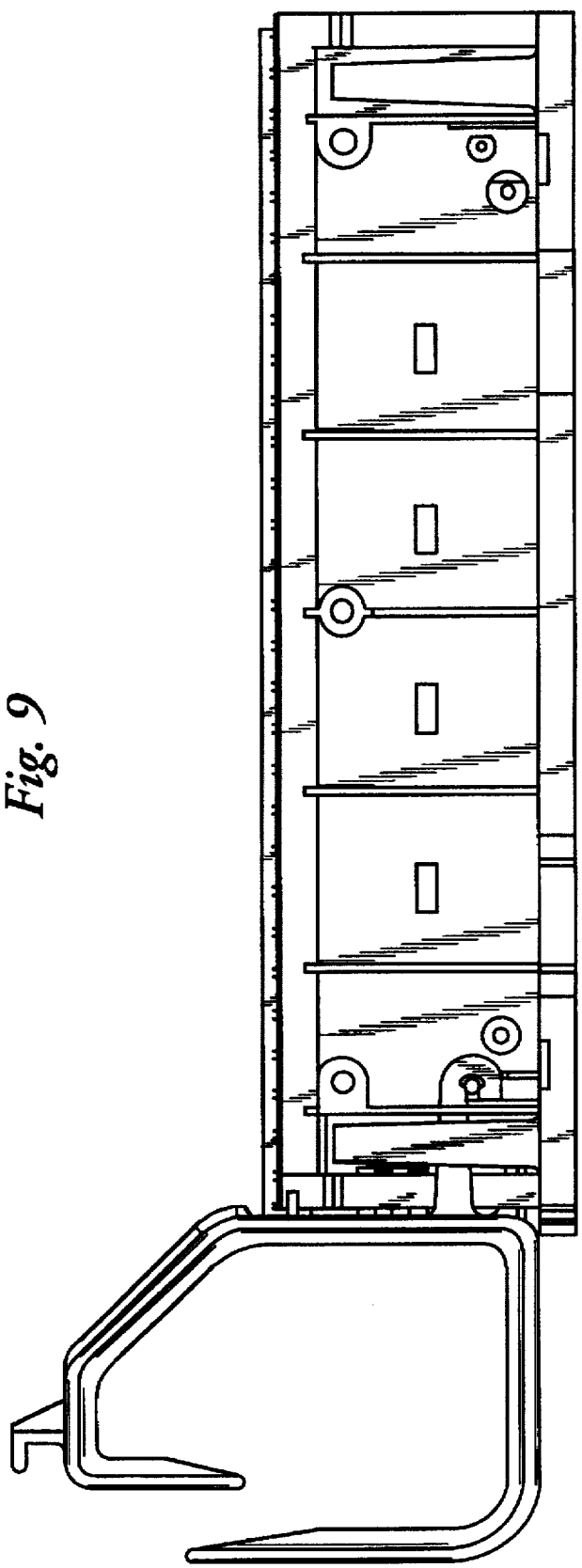
FIG. 9 is a side view of the bracket with the end cable holder.

In the preferred embodiment, the brackets include ground bar mounting means 53 for mounting a grounding bar 55 onto the bracket and adjacent the termination blocks 7 and 15. The grounding bar is shown in FIG. 7 and is shown in relation to the brackets and the termination blocks in FIG. 8.

It is also preferable to have cable tie means such as cable anchors 56 and cable slots 57. Cable ties can be fastened to the cables and the cable tie means then secure the cables to the brackets. The base 17 of the brackets preferably defines a cable axis opening 58 to allow access for cables when the cables come through a wall upon which the brackets are to be mounted.

Figure 10:
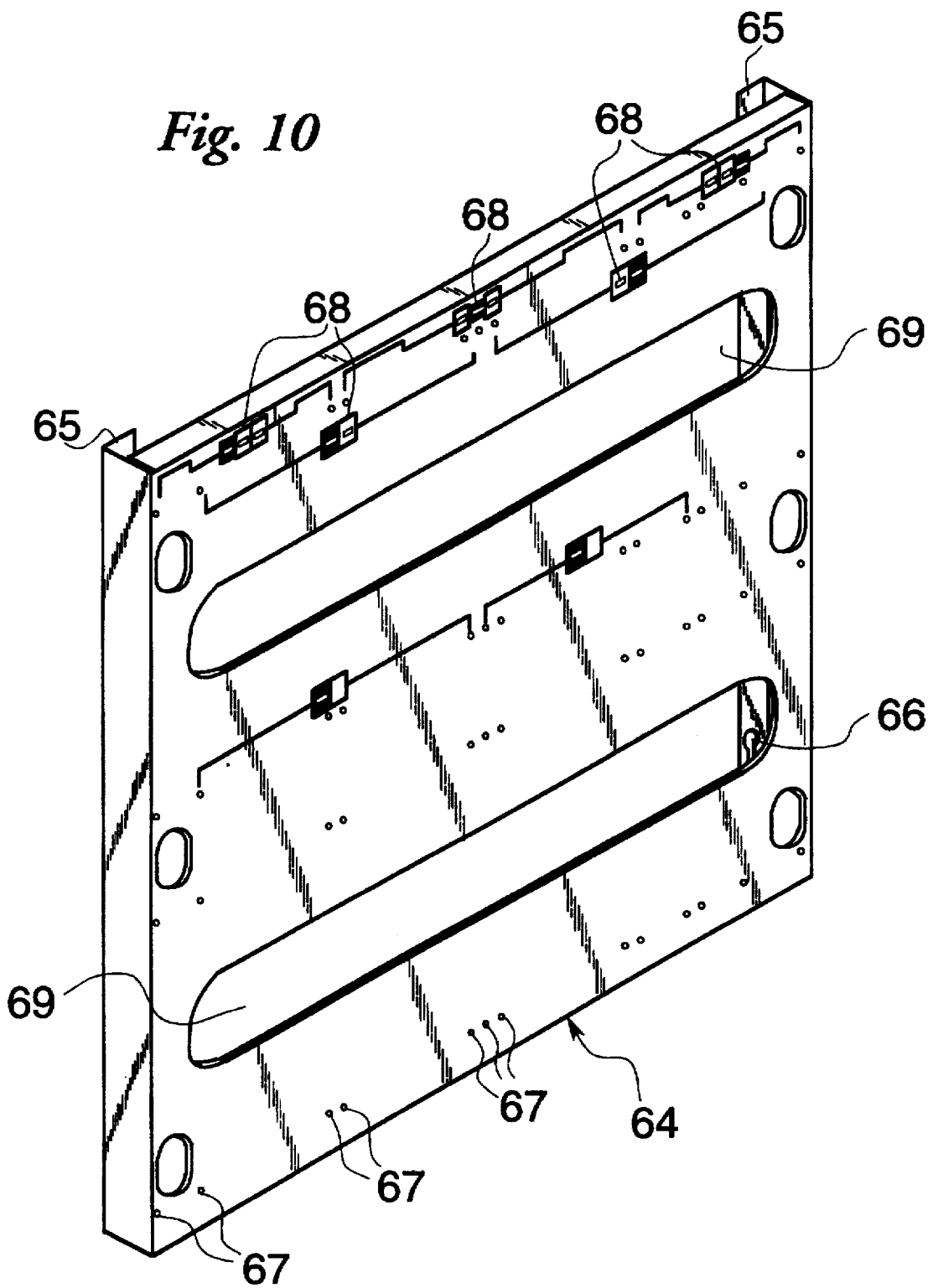
FIG. 10 is a view of a backboard.
Figure 11:
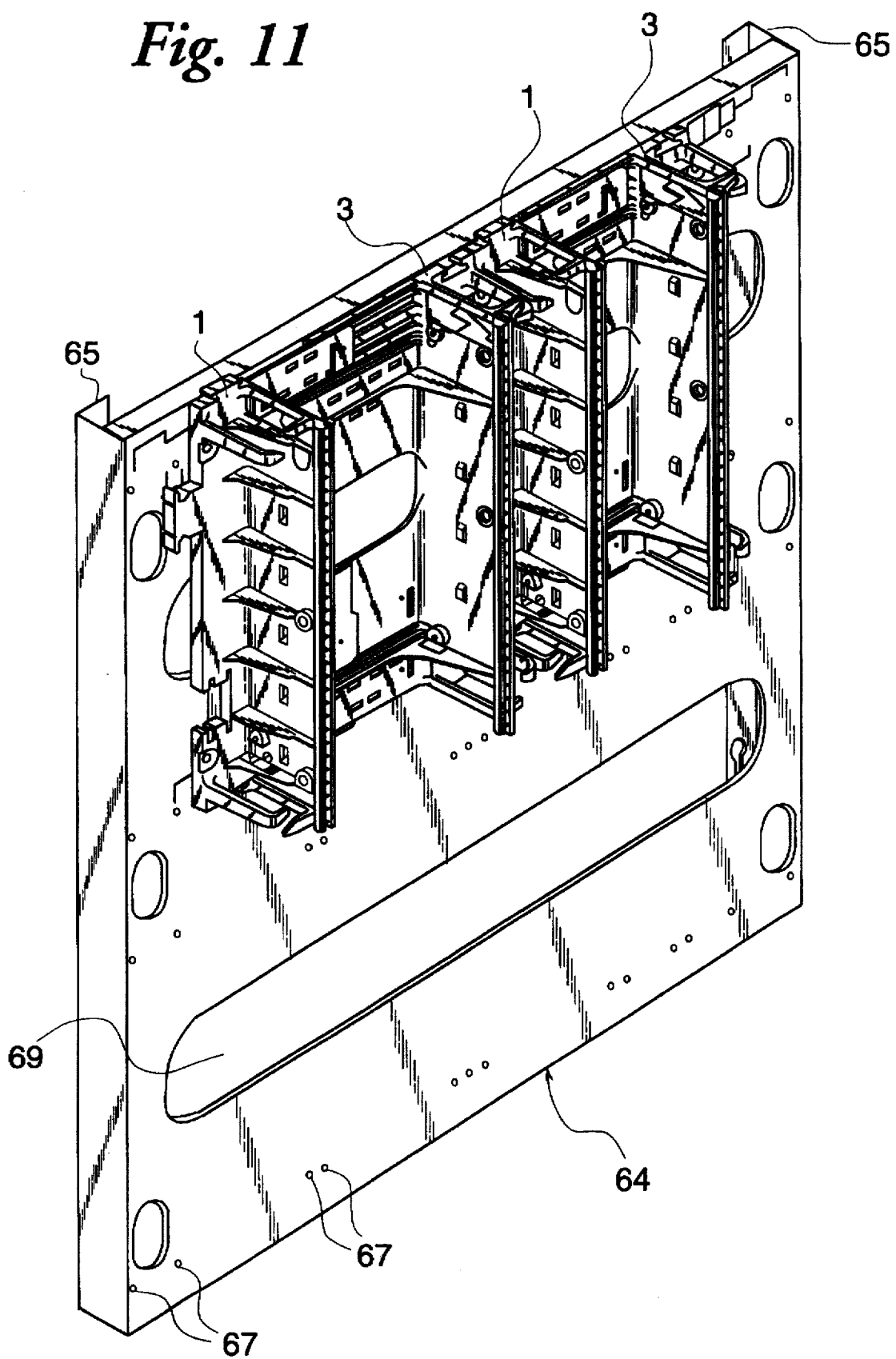
FIG. 11 is a view of the backboard with a first combination of brackets.
Figure 12:
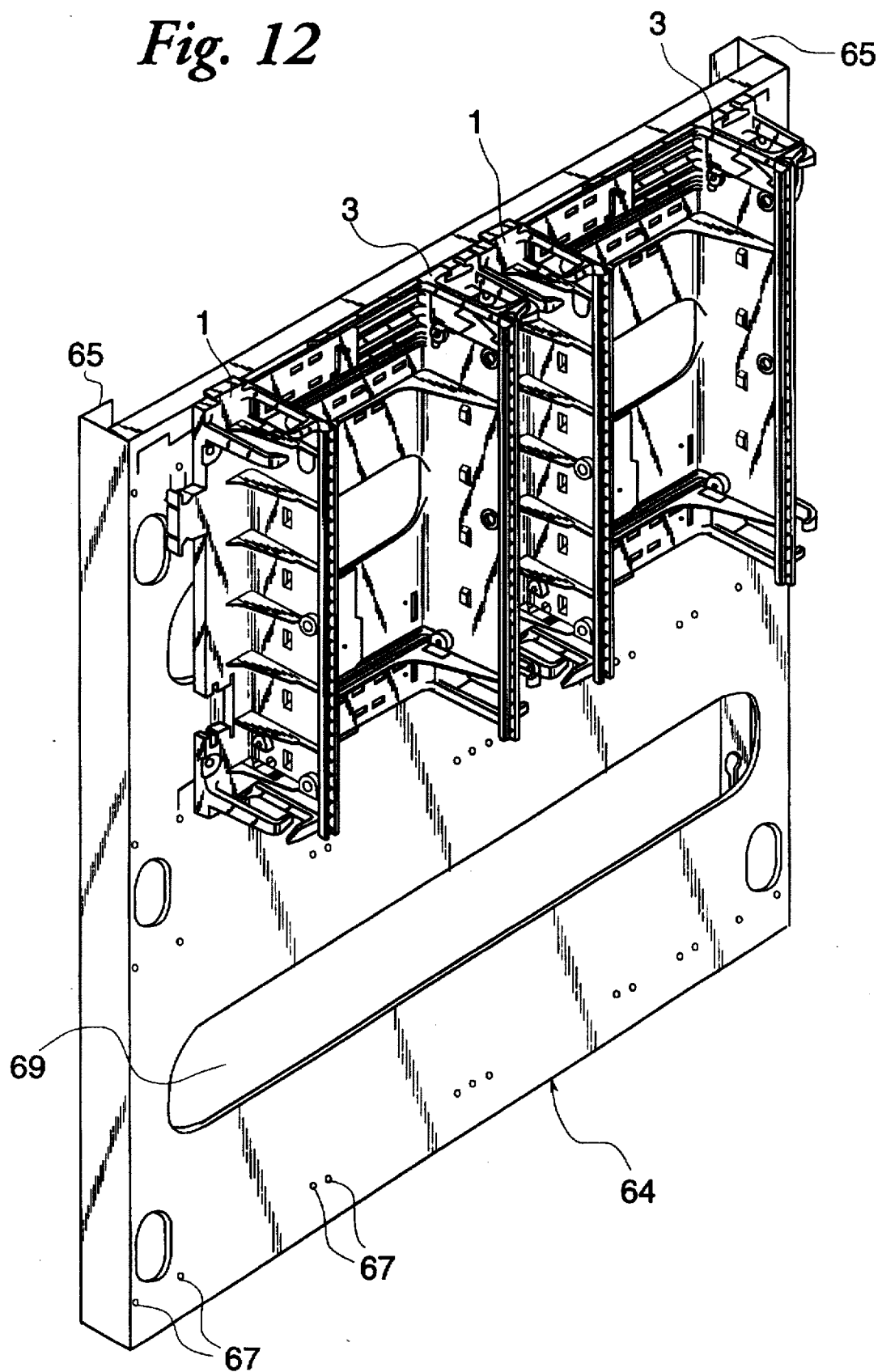
FIG. 12 is a view of the backboard with a second combination of brackets.
Figure 13:
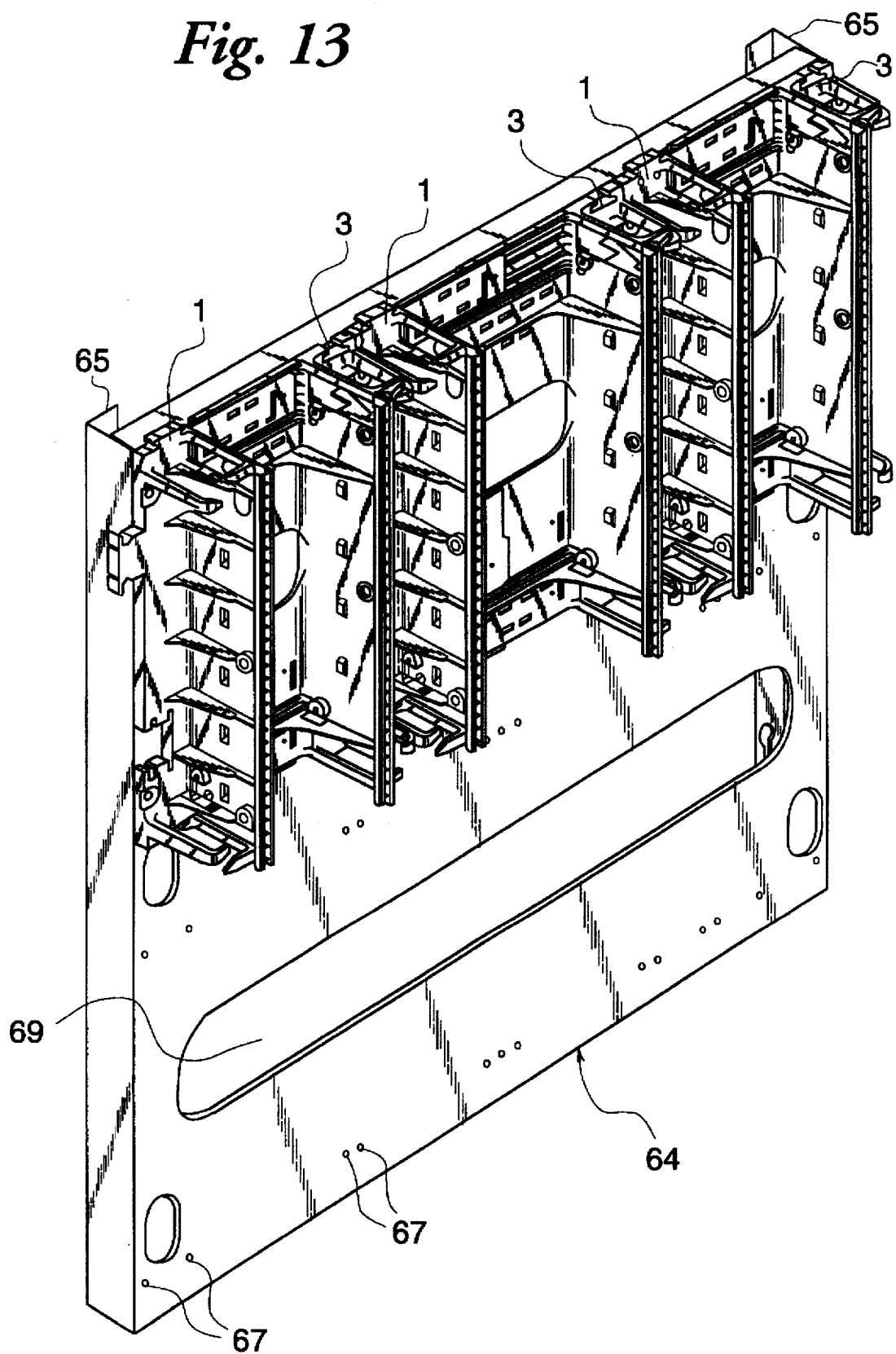
FIG. 13 is a view of the backboard with a third combination of brackets.

In a preferred embodiment, as shown in FIG. 10, a backboard 64 is used to mount the brackets 1, 3 and cable holders 51 to a wall or equipment rack. The backboard 64 has supports 65 which are positionable against the wall or equipment rack and preferably define cutouts 66 which enable the backboard 64 to hang on protrusions from the equipment rack. The backboard defines a plurality of mounting holes 67 for attaching the brackets 1, 3 and cable holders 51. The mounting holes are pre-drilled for a plurality of different arrangements of the brackets. As described previously, a set of two brackets can have different spacing depending on the size of the terminal block that the brackets are to hold. The mounting holes 67 are positioned to accommodate different combinations of brackets holding different or same sized terminal blocks 7, as shown in FIGS. 11-13. The backboard 64 also preferably includes mounting indicia 68 indicating which mounting holes are to be used for specific combinations of brackets with specific sized terminal blocks 7. Backboard entry holes 69 can be provided in the backboard 64 for passage of cables from the wall, or just behind the backboard 64, to the area in between the brackets 1, 3. The backboard itself can come in different sizes for different equipment racks and to accommodate larger and larger combinations of brackets.

While specific embodiments of the invention have been shown and described in detail to illustrate the application of the principles of the invention, it will be understood that the invention may be embodied otherwise without departing from such principles.

What is claimed is:

1. A mounting assembly for termination blocks with mounting connectors, the assembly comprising:

a first bracket having a base portion and a mounting portion extending from said base portion, said first bracket including mounting means positioned on said mounting portion and providing a surface for connection with mounting connectors of the termination blocks;

a second bracket substantially identical to said first bracket;

slide connection means connected to each of said first and second brackets and for connecting said first and second brackets, said slide connection means variably spacing said mounting means for connection of said mounting means to different sized termination blocks while said first and second brackets are connected to each other.

2. An assembly in accordance with claim 1, wherein:

said slide connection means is mounted on said base of a respective said bracket.

3. An assembly in accordance with claim 1, wherein:

said slide connection means is integrally formed with a respective said bracket.

4. An assembly in accordance with claim 1, wherein:

said slide connections means of each said bracket are substantially identical.

5. An assembly in accordance with claim 1, wherein:

said first and second brackets with respective said slide connection means are substantially identical.

6. An assembly in accordance with claim 1, wherein:

said slide connection means connects said first and second bracket when said first bracket is in an angular position substantially 180 degrees from said second bracket.

7. An assembly in accordance with claim 6, wherein:

said angular position is about an axis normal to said base.

8. An assembly in accordance with claim 1, wherein:

said slide connection means includes snap position means for positioning said mounting means of respective said brackets at predetermined distances.

9. An assembly in accordance with claim 8, wherein:

said predetermined distances correspond to standard sizes of the termination blocks;

the termination blocks are electrical termination blocks.

10. An assembly in accordance with claim 1, wherein:

said mounting portion of a respective said bracket extends substantially normal to said base.

11. An assembly in accordance with claim 1, further comprising:

link means positioned on said brackets and for linking a slidably connected first and second brackets with other adjacent brackets.

12. An assembly in accordance with claim 11, wherein:

said first and second brackets; and said adjacent brackets with respective said link means are substantially identical.

13. An assembly in accordance with claim 11, wherein:

said base has lateral sides and end sides;

said link means links said adjacent brackets on both one of said end sides and one of said lateral sides.

14. An assembly in accordance with claim 13, wherein:

said link means links said adjacent brackets on both of said end sides.

15. An assembly in accordance with claim 13, wherein:

said slide connection means is positioned on one lateral side of a respective said bracket, and said link means links said adjacent bracket on an opposite said lateral side.

16. An assembly in accordance with claim 1, further comprising cable holder means connected to one of said brackets and for holding cables.

17. An assembly in accordance with claim 16, wherein:

said base has end and lateral sides and end sides;

said cable holder means is positionable on both of said end sides and one of said lateral sides.

18. An assembly in accordance with claim 16, wherein:

said cable holder means is designed to be repetitively connected and disconnected from said brackets without destruction of said cable holder means.

19. An assembly in accordance with claim 18, wherein:

said cable holder means holds cables on both of said end sides.

20. An assembly in accordance with claim 1, further comprising:

a ground bar attached to one of said first and second brackets.

21. An assembly in accordance with claim 1, wherein:

said base of said first and second brackets define an cable access opening.

22. An assembly in accordance with claim 1, wherein:

said first and second brackets have cable tie means for attaching to cable ties.

23. An assembly in accordance with claim 1, wherein:

said first and second brackets with respective said slide connection means are substantially identical;

said slide connection means connects said first and second brackets when said first bracket is in an angular position substantially 180 degrees from said second bracket, said angular position is about an axis normal to said base;

said slide connection means includes snap positions for positioning said mounting means of respective said brackets at predetermined distances;

said mounting portion of a respective said bracket extends substantially normal to said base link means positioned on said brackets and for linking a slidably connected first and second brackets with other adjacent brackets, said first and second brackets and said adjacent brackets with respective said link means are substantially identical said base has lateral sides and end sides;

said link means links said adjacent brackets on both of said end sides and one of said lateral sides.

a backboard positionable adjacent said first and second brackets, said back board having supports mountable on a wall, said backboard defining a plurality of mounting holes for mounting a plurality of different combinations of said first and second brackets, said plurality of mounting holes also mounting combinations of said first and second brackets with a plurality of additional first and second brackets to accommodate different combinations of terminal blocks.

24. An assembly in accordance with claim 1, wherein:

said mounting means is a mounting rail connectable with mounting connectors of a nip-clinch type.

* * * * *